July 29, 1924.
J. B. DAVIS
1,503,035
LIQUID DISPENSING APPARATUS
Filed Aug. 7, 1920   2 Sheets-Sheet 1
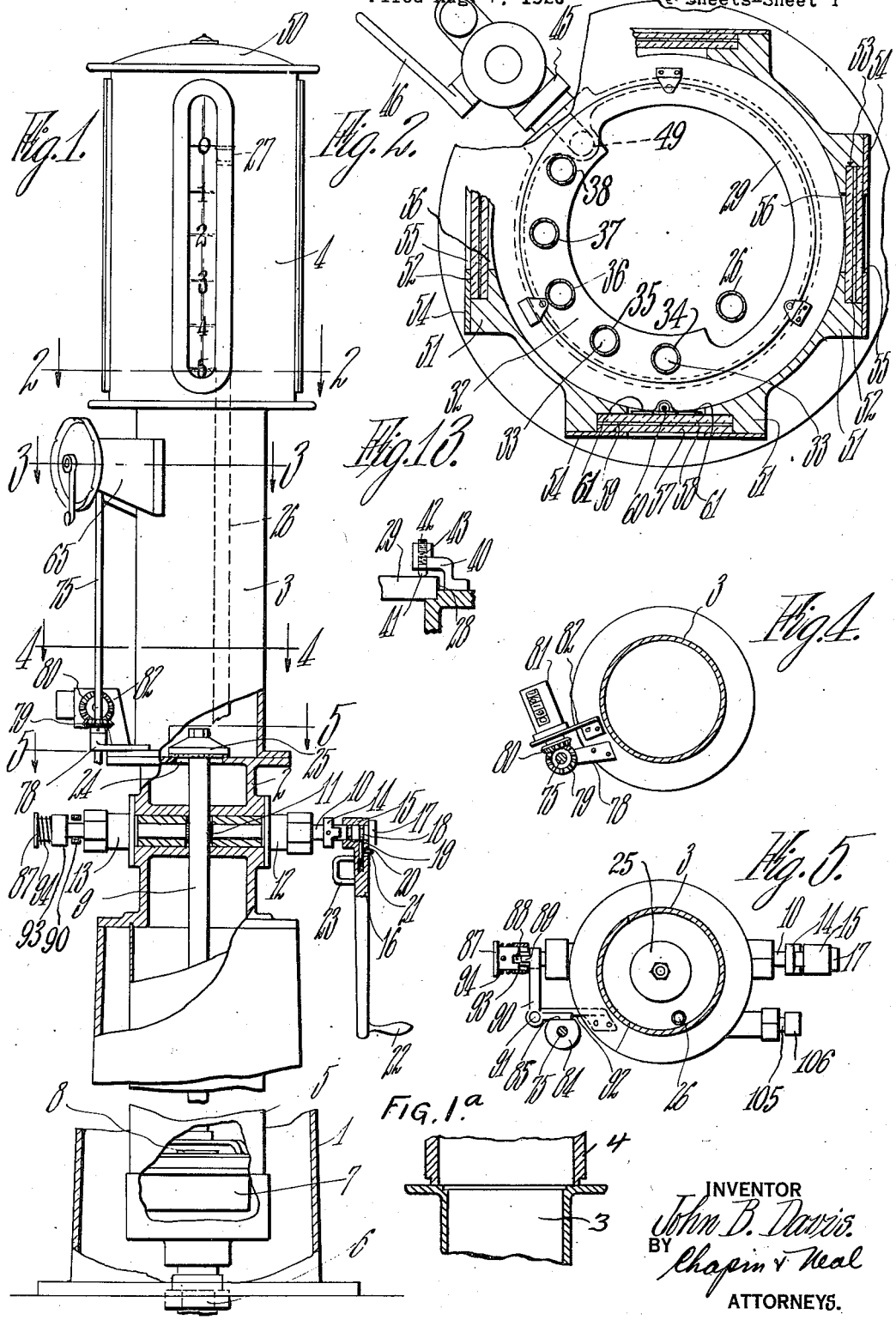
INVENTOR
John B. Davis.
BY Chapin & Neal
ATTORNEYS.

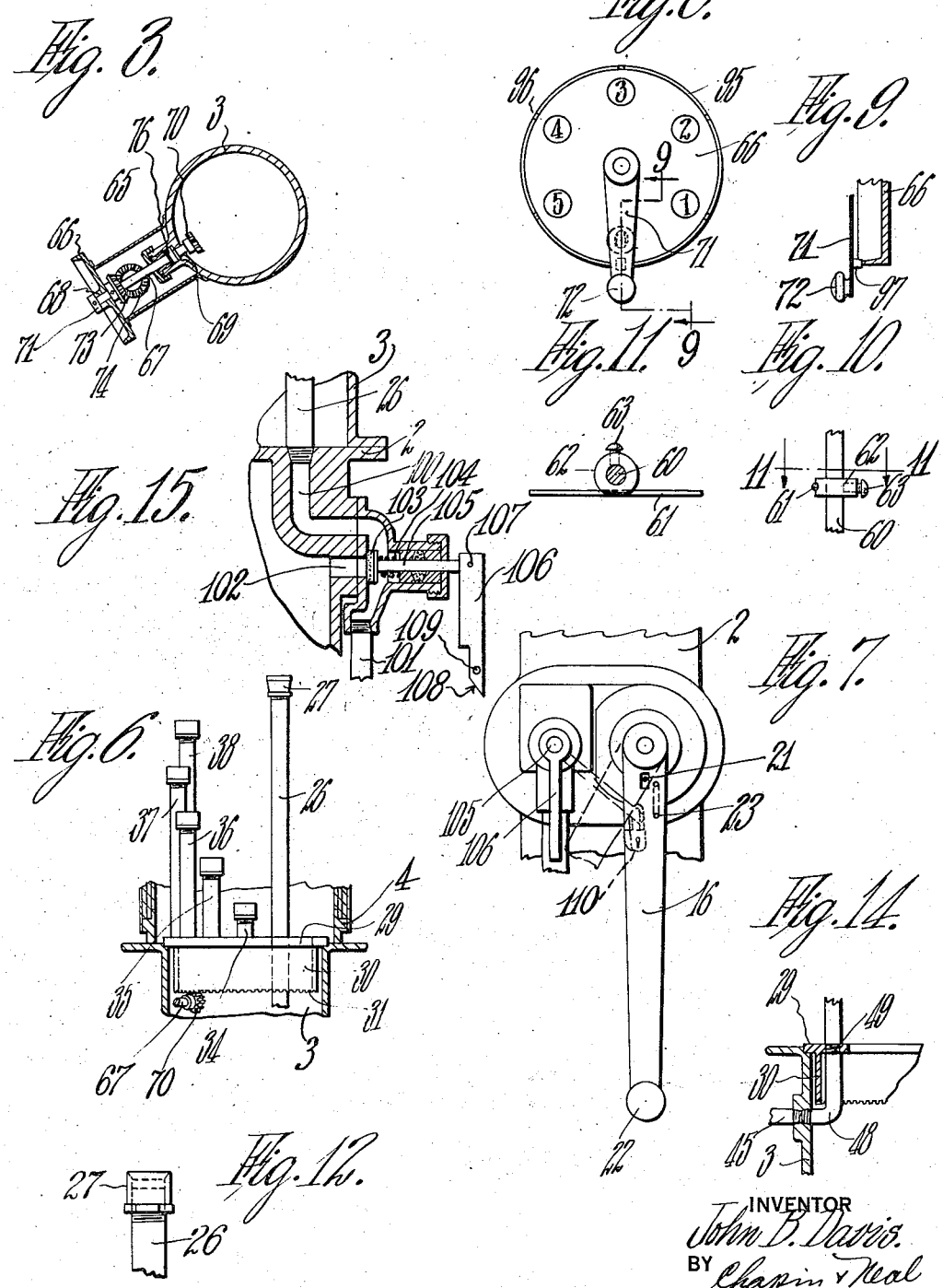

Patented July 29, 1924.

1,503,035

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

LIQUID-DISPENSING APPARATUS.

Application filed August 7, 1920. Serial No. 401,968.

*To all whom it may concern:*

Be it known that I, JOHN B. DAVIS, a citizen of the United States, residing at Springfield, in the county of Hampden and State of Massachusetts, have invented new and useful Improvements in Liquid-Dispensing Apparatus, of which the following is a specification.

This invention relates to an improved liquid-measuring apparatus which, while capable of general use for measuring liquids of different kinds wherever it is desired to dispense liquids in different measured quantities, is especially adapted for use in the dispensing of liquids such as gasoline or the like.

One object of the invention is to provide liquid-dispensing apparatus of this character wherein novel mechanism is employed for the purpose of permitting the withdrawal of any one of various different measured quantities of liquid.

A further object of the invention is to provide a novel means for indicating to the purchaser the quantity of liquid withdrawn from the measuring apparatus.

A further object of the invention is to provide improved means for setting the discharge mechanism for the withdrawal of a measured quantity of liquid.

A further object of the invention is to provide suitable means for indicating the total quantity of liquid withdrawn from the apparatus during a given period of time.

A further object of the invention is to provide suitable connections between the setting mechanism, the "totals" indicating mechanism, and the liquid supply means, whereby certain of these mechanisms may be simultaneously operated and whereby certain of said mechanisms may be mutually controlled.

A further object of the invention is to provide a novel means for indicating "totals" of all the different quantities of liquid withdrawn from the apparatus during a given period of time.

A further object of the invention is to provide novel locking means for securing certain of the operating mechanisms against use by an unauthorized person, and to provide mechanism for mutually locking certain of the operating mechanism and preventing their operation by any unauthorized person.

Another object of the invention is to provide novel and efficient means for correctly indicating the level of the liquid in the reservoir.

A further object of the invention is to provide a device of this character which is of simple construction and efficient in operation.

Further objects of the invention relate to the economics of manufacture and various details of construction, as will be apparent from the following detailed description.

In the accompanying drawings:

Fig. 1 is an elevational view of the improved liquid-dispensing apparatus, certain of the parts being broken away to more clearly indicate the relative position of certain of the operating mechanisms;

Fig. 1ᵃ is a detail sectional view of the reservoir and the cylindrical casing upon which it is supported;

Fig. 2 is a horizontal sectional view, taken on the line 2—2 of Fig. 1, and illustrating the relative position of certain of the operating parts contained within the liquid reservoir;

Fig. 3 is a horizontal sectional view taken along the line 3—3 of Fig. 1;

Fig. 4 is a horizontal sectional view taken along the line 4—4 of Fig. 1;

Fig. 5 is a horizontal sectional view taken along the line 5—5 of Fig. 1 and illustrating certain of the connections between the liquid supply means and the indicating and setting mechanism;

Fig. 6 is a vertical sectional view through a portion of the reservoir;

Fig. 7 is a side elevational view showing the operating crank and relief valve for the overflow pipe, and illustrating their relative position when the operating crank is locked against movement;

Fig. 8 is a side elevational view of a portion of the setting and indicating mechanism for controlling discharge from the reservoir;

Fig. 9 is a detail sectional view taken along the line 9—9 of Fig. 8;

Fig. 10 is a detail elevational view of a portion of the mechanism for indicating the true level of the liquid in the reservoir;

Fig. 11 is a horizontal sectional view taken along the line 11—11 of Fig. 10;

Fig. 12 is an elevational view showing the manner of adjustably connecting an outlet section of the overflow pipe or one of the discharge tubes;

Fig. 13 is a detailed view, partly in section, illustrating the form of holding means employed to resiliently hold the valve in position upon its seat;

Fig. 14 is a detail sectional view, illustrating the position of the circular plate relative to the outlet pipe; and Fig. 15 is a detail sectional view, showing the means for draining the reservoir and its connection with the locking mechanism for locking the apparatus.

In the embodiment of the invention illustrated herewith, 1 designates the base portion of the apparatus which is adapted to seat upon, and be secured in any suitable manner to, a proper foundation. Surmounting the base portion is a frame member 2, provided with a passage extending vertically therethrough, and which supports a cylindrical casing 3, above which is located the reservoir 4 provided with transparent portions in the wall thereof for a purpose which will be more fully described.

Located within the base portion 1 is a pump cylinder 5, which is connected by a pipe 6 with a source of liquid supply (not shown). A vertically reciprocable piston 7 is located within the pump cylinder 5 and fits closely against the inner surface thereof for raising liquid from the source of supply when the piston is raised. The piston is provided with a check-valve 8 which is capable of being readily raised when the piston is lowered to permit liquid to rise above the piston, and a suitable form of check valve (not shown) is located in the supply pipe 6, as is usual in pumps of this character. A piston rod 9 is secured to the piston and extends upwardly therefrom.

The casing 2 is provided with a suitable bearing within which is rotatably mounted a shaft 10, which has a pinion 11 secured thereto intermediate its ends and located in meshing engagement with a rack formed integral with or secured to one side face of the rod 9, whereby the rod and the piston carried thereby may be raised to pump the liquid from the source of supply to the reservoir. The shaft 10 is retained against longitudinal movement and extends through stuffing-boxes 12 and 13 from opposite sides of the casing 2 while the ends of the shaft extend beyond the stuffing-boxes for purposes which will now be described. Firmly secured to one of the projecting ends of the shaft is a collar 14 provided with a clutch face adapted to cooperate with a similar clutch face formed upon one end of the hub portion 15 of a crank-shaft 16 which is rotatably mounted upon the shaft 10 and is prevented from becoming disengaged therefrom by a nut 17. A pair of annular grooves 18 and 19 are formed in the outer end portion of the shaft 10, which grooves are located beneath the hub 15 and are adapted to receive a spring-pressed detent 20 slidably mounted in the crank 16 and capable of being manually actuated by means of an outwardly-projecting pin 21 to remove the detent from either of the grooves with which it may happen to be engaged. The crank is provided with a handle 22 for rotating the same and a loop 23 is carried by the crank for a purpose which will be more fully described hereinafter.

The detent 20 is adapted to be withdrawn from the outer groove 19 by means of the pin 21 when it is desired to slide the hub portion of the crank into position to place the cooperating faces of the clutch members in engagement, whereby the shaft may be rotated and the piston raised. When the pump piston has been thus raised the detent may be disengaged from the groove 19 in a similar manner and the piston is thus free to fall of its own weight without rotating the crank during its return movement to its lowermost position. In order to facilitate this movement of the piston, the piston head 7 is preferably made quite heavy to cause the same to quickly return to its lowered position when it is no longer held raised by the crank. The gasoline, when raised by the pump piston, passes from the pump cylinder upwardly through a passage 24 into the cylindrical portion 3 of the apparatus and to the reservoir 4 with which the cylindrical portion communicates. A valve 25, secured to the upper end portion of the rod 9, seats upon the upper surface of the casing 2 to close the opening 24 formed therein and prevent any great head of liquid from acting on the liquid in chamber 2, which action, if permitted, might tend to cause leakage through the stuffing-boxes 12 and 13.

The reservoir 4 is preferably of general cylindrical form, and the interior thereof is in constant communication with the interior of the cylindrical portion 3. An overflow pipe 26 extends upwardly through the cylindrical portion and the reservoir, the upper end of said pipe being provided with an adjustable inlet 27, threaded upon the upper end thereof and capable of being readily raised and lowered sufficiently to compensate for slight changes in position of the various parts of the mechanism, and to maintain the level of the liquid at a proper point in the reservoir after the pump has been operated to fill the same.

The interior base portion of the reservoir is provided with a circular groove 28, within which fits a circular plate 29, provided with a depending circular or arc-shaped portion 30, having a crown-gear 31 formed on the lower face thereof as shown in Fig. 6 of the drawings. The plate 29 has the interior portion cut away to form a segmental portion 32 of sufficient width to provide space for a plurality of spaced openings 33 arranged substantially equidistant from each other and arranged a substantially equal distance from the center of rotation of the circular plate. Vertical tubes 34, 35, 36, 37 and 38 of different heights are secured in the openings 33 and preferably arranged in the order of their heights along the circular plate. Each of said tubes is provided at the upper end thereof with an adjustable inlet 39, which is threaded or otherwise mounted upon the upper end of each tube so as to be capable of adjustment.

A plurality of brackets 40 is secured to the base of the reservoir in any suitable manner, each of said brackets being provided with a portion overhanging the circular plate, which portion is provided with a spring-pressed plunger 41 projecting downwardly therefrom and bearing against the upper surface of said plate for holding the same firmly seated in the groove 28. An adjustable set-screw 42 bears against the spring 43 engaging the plunger and thus provides means for increasing or decreasing the pressure of the plunger 41 against the circular plate.

An outlet connection 45 is secured to the casing 3 adjacent to the base of the reservoir, and is provided with a suitable valve (not shown), adapted to be operated by a valve-operating handle 46, and is also preferably provided with suitable means for connection to a hose whereby liquid, such as gasoline, may be delivered to a tank in an automobile. A pipe 48, which may or may not be formed integral with the outlet connection, extends inwardly from the casing 3 and has an inlet 49 formed to fit closely against the lower face of the segmental portion 32 of the plate. Thus, as the plate is rotated by the crown-gear 31, the inlet may be successively brought into registry with the base of the tubes 34, 35, 36, 37 and 38, and, by means of mechanism which will be more fully described hereinafter, may be locked in registering position with any of these tubes. The inlet opening of the pipe 48 so cooperates with the under face of the plate that, when the same is brought into proper registry with the base of one of the tubes, no leakage takes place between the inlet opening and the tube at their point of connection, and they, in effect, form a continuous passage to the open upper end of the tube. Thus, when the plate 29 is rotated to place any one of the tubes in registry with the inlet opening of the pipe 48, after the reservoir has been filled with liquid to the level of the opening in the overflow pipe 26, the quantity of liquid in the reservoir between the upper end of that tube in registry with the pipe and the upper end of the oveflow pipe may be withdrawn by opening the valve in the outlet connection.

The reservoir 4 is formed of any suitable material and may be given any desired shape, but in the present instance is shown as substantially cylindrical. A cap-plate 50 is secured to the open upper end of the reservoir for closing the same and is preferably so formed as to permit the admission or expulsion of air from the upper portion of the reservoir as the liquid rises or falls therein. The reservoir may be provided with a plurality of transparent portions, whereby the level of the liquid in the reservoir may be observed, and the amount withdrawn at any time indicated to the purchaser by means of a suitable graduated scale. In the present instance, four of these transparent portions are provided in the sides of the reservoir although the number may be increased or diminished, as may be found to be desirable or expedient.

In order to provide means for securing these transparent inserts in place, suitable bosses 51 are formed in the reservoir casing, and transparent inserts 52 are positioned in suitable recesses 53, formed in the bosses, within which the inserts fit closely and are properly held in place by plates 54, secured in any suitable manner to the bosses. Each plate is provided with an elongated opening 55, located in registry with a similar opening 56 formed in the reservoir casing, whereby the level of the liquid can be readily observed.

These transparent inserts may be made in any desired manner, but in the present instance are formed of two glass plates 57 and 58 having a thin celluloid plate 59 located therebetween. The glass plates 57 and 58 are fused, or otherwise firmly secured, to the intermediate celluloid plate 59 so that the three form, in effect, a single integral plate. In the manufacture of these transparent inserts it has been found to be possible to so bind or fuse the adjacent surfaces of the glass plates to the celluloid plate that a single substantially integral plate is formed, wherein the parts are so firmly bound together that if the completed plate is struck a blow sufficient to shatter the same the glass and celluloid shatter together instead of the glass being chipped away or separated from the celluloid plate.

In constructing the transparent inserts as above described, suitable numerals and lines are preferably painted or stamped upon the celluloid plate before the same is secured, between the two opposing glass plates, whereby a graduated scale, which may be of the type shown in Fig. 1 of the drawings, is firmly fixed to the insert.

The reservoir 4 is mounted at the top of the pump structure and is considerably above the level of the eye of an observer upon the sidewalk and the graduations upon the transparent inserts are spaced away from the liquid by a distance equal to the thickness of the glass plates 58. It will be obvious therefore, that if said scales are graduated to indicate the volume of liquid in the reservoir when the level of said liquid is exactly opposite said graduations, the latter, when viewed obliquely from a point below said level, will not coincide with the liquid level until the reservoir has filled to a point somewhat above the true level of the quantity desired. To avoid such inaccuracy of indication additional markers 60 are provided in the interior of the tank. These markers being actually in contact with the liquid when the latter reaches them, there will be no possibility of erroneous indication whatever the angle of vision may be. Furthermore the markers 61 are adapted to be adjusted as may be found necessary to compensate for temperature changes or other variations. With the above ends in view, the markers 60 comprise thin transverse bars, each of which is carried by a separate sleeve 62 slidably mounted upon a vertical rod 60 that is located in the reservoir adjacent the transparent insert. The sleeves 62 are adapted to be held in spaced positions upon the rod by means of set-screws 63 and may be so located as to indicate the proper level of the liquid to correspond with each of the graduated divisions upon the scale. This improved form of indicating mechanism is such that the transverse bars are readily capable of being adjusted upon the vertical rod and locked in adjusted position whereby they may be moved and locked in a variety of different positions to correspond to different scales or may be adjusted to compensate for temperature or other variations. Moreover, since the transverse bars are spaced slightly from the transparent inserts, their position at or near the level of the liquid can be determined with great readiness even when viewed from an angle through the insert.

The improved mechanism, for setting the discharge mechanism for the withdrawal of any of various fixed and measured quantities of liquid from the reservoir, will now be described. Secured to the casing 3 in any suitable manner, and extending outwardly therefrom, is a casing 65 having a dial-plate 66 for closing the outer end thereof, which dial-plate may be fixedly secured to the casing 65, if desired. A shaft 67 is mounted for rotation in bearings 68 and 69, formed in the dial-plate and casing 3, respectively. The shaft extends through the casing 65 and has one end projecting through the dial-plate while the opposite end projects within the casing 3. The shaft 67 is provided at its inner end with a spur-gear 70 meshing with the crown-gear 31, previously described, while a crank 71, provided with a handle 72, is secured to the outer end thereof and moves over the dial-plate 66 as the shaft is rotated. A bevel-gear 73 is fixed to the shaft 67 intermediate its ends and meshes with a bevel-gear 74 fixed to a vertical shaft 75 which is located outside the casing 3 and projects within the casing 65. Suitable packing 76 is provided for the bearing 69, to prevent the escape of liquid therethrough around the shaft.

The shaft 75 extends downwardly from the casing 65 and has a bearing in a bracket 78 secured to the base of the casing 3. A bevel-gear 79 is fixedly secured to the shaft 75 adjacent the bracket 78, and is in meshing engagement with a bevel-gear 80 which operates a counting, or "totals," recording mechanism 81 supported on a bracket 82. It will thus be seen that, when the crank 71 is actuated to rotate the shaft, the circular plate is rotated in its seat through the spur-gear 70 and crown-gear while at the same time rotation is imparted to the vertical shaft 75, thus operating the counting or "totals" indicating mechanism.

Secured to the shaft 75 below the gear 79 is a cam 84 having a cam face 85 for controlling the liquid supply means, as will now be described. As previously stated, the opposite ends of the shaft 10 project beyond the casing 2, and the end opposite to that which carries the shaft is provided with a collar 87 firmly secured thereto, said collar being provided with a recess 88 formed upon the inner face thereof for the reception of a projection 89 carried by a bell-crank 90. The bell-crank is pivoted at 91 to a bracket 92 carried by the casing 2, and one arm thereof is so positioned as to be operatively engaged by the cam 84. A sleeve 93 is slidably mounted on the collar 87 and is forced inwardly by a coiled spring 94 into engagement with one arm of the bell-crank lever for normally holding the lug on the bell-crank out of engagement with the recess in the collar.

Upon references to Figs. 1 and 8 of the drawings, it will be seen that the plate 66, which is preferably of circular form, is provided with a circular flange 95 provided, preferably at spaced intervals, with notches 96, each of which is designated by a numeral corresponding with one of the numerals of the graduated scale carried by the reservoir. The crank 71 may be provided with a suitable detent or projection 97 adapted to engage any one of said notches when the crank is moved into proper position for causing the same to engage one of the notches.

From the above description, it will be seen that in supplying fixed and measured quantities of liquid, the shaft 10 is rotated by pressing the crank 16 inwardly in a direction axially of the shaft until the detent 20 engages with the groove 19, thus causing the clutch faces on the hub of the crank and the collar 14 to engage for insuring rotation of the shaft upon rotation of the crank 16. On rotation of the shaft, a supply of liquid may be lifted into the reservoir 4. When the piston has been raised to its upper limit, the crank may be moved axially of the shaft 10, whereby the detent is disengaged from the groove 19 and brought into engagement with the groove 18 to disengage the clutch faces carried by the collar 14 and hub 15, thus permitting the plunger to fall by its own weight without turning the crank 16. When the reservoir has been filled so that the liquid reaches a point above the top of the pipe 26, the excess liquid will be withdrawn by the overflow pipe until it stands at a level with the open end thereof, and the apparatus is then in position for withdrawing any desired quantity of liquid within the limit of its capacity.

The crank 71 is thereupon turned to bring it into position opposite the proper numeral, thus rotating the shaft 69 and the circular plate 29, whereby the proper tube carried by the circular plate is brought into registry with the outlet pipe. Thereupon, the quantity of liquid above the open end of that tube, and below the open end of the overflow pipe, may be withdrawn when the outlet pipe is opened. When the shaft 67 is rotated by the crank 71 to rotate the circular plate into position for withdrawing the proper quantity of liquid, the vertical shaft 75 is also rotated. Thus the counting mechanism is operated to add the number of gallons, or other units, thus indicated to be withdrawn, to the "totals" as indicated by the "totals" indicating mechanism 81. As the shaft 75 is rotated, the rounded portion of the cam 84 is turned into engagement with one arm of the elbow-lever 90, thus swinging said lever against the tension of coiled spring 94 and causing the projection 89 on the elbow-lever to engage the recess 88 in collar 87 and thereby locking the shaft against movement. It will be seen that, when the shaft 10 is thus locked against rotation, no more liquid can be pumped into the reservoir until such time as the shaft has been released by returning the crank 71 to its zero position as shown in Fig. 1. After the valve, actuated by the handle 46, has been opened and the liquid, between the top of that tube which is in registry with the outlet pipe and the top of the overflow pipe and the top of the overflow pipe 26, has been withdrawn, such valve is closed and the crank 71 returned to its zero position, thus freeing the shaft 10 to permit refilling of the reservoir.

When the crank 71 is returned to its initial position, the circular plate 29 is, of course, returned to its original position and the shaft 75 is rotated in the opposite direction and to an extent equal to that which it was rotated when the crank was turned to bring the proper tube into registry with the outlet. As the shaft 75 is thus rotated in reverse direction, the gear 80 which operates the "totals" mechanism is correspondingly rotated, but a suitable overrunning clutch, or other equivalent means, is provided in the counter whereby the "totals" as indicated is not changed by this reverse rotation of the shaft 75.

In order to lock the operating mechanism and thus prevent the liquid from being withdrawn by any unauthorized person, suitable locking means is provided, whereby the shaft 10 may be permanently locked against rotation. Preferably, means, operable in connection with the locking means, are provided for draining liquid from the reservoir when the apparatus is left for a considerable period of time. In order to accomplish this result, a passage 100 is formed in the frame member 2, with which the overflow pipe 26 connects, and which communicates with the source of liquid supply through a pipe 101. An opening 102 is formed in the frame member for placing the passage 100 in communication with the main liquid supply passage in the frame member, and this opening is normally closed by a valve 103, which is forced inwardly to close the passage by means of a coiled spring 104 surrounding a stem 105 which is secured to the valve 103 and extends outwardly therefrom through the casing. An arm 106 is fixedly secured to the stem 105, as at 107, the arm being provided with an inclined end 108, having an opening 109 formed therein for a purpose which will later be described.

When it is desired to lock the apparatus, as when the same is to be left for a considerable time, the arm 106 is swung to the dotted line position, as shown in Fig. 7, and the inclined end portion 108 is then in position to be engaged by the loop 23 carried by the crank arm. The crank arm 16 is then turned into its dotted-line position, as in Fig. 7, whereby the inclined portion of the arm is engaged by the loop to draw the valve stem, and the valve carried thereby, outwardly against the tension exerted by the spring 104. This places the interior of the casing in communication with the overflow pipe and drains the reservoir and the casing 3 down to the level of the passage 102. When the parts are in such position, a padlock 110 may be passed through the opening 109 and the several parts thus locked against movement. In this connection, it will be noted that when the crank 16 is rotated to its dotted-line position, as shown in Fig. 7, the clutch faces, carried by the hub 15 and collar 14 are engaged and the shaft 10 is rotated a sufficient distance to prevent the projection 89 on the elbow-lever 90 from engaging with the recess 88 in the collar 87 and thus prevent the shaft 75 from being rotated, since the elbow-lever cannot be moved a sufficient distance to permit the rounded portion of the cam 84 to bear against the lever. In this way, the crank 71, and the various parts operated thereby, are locked against movement by the locking mechanism above described for locking the main operating crank.

In the operation of the apparatus above described liquid is first forced upwardly into the reservoir by the piston until the reservoir is filled to a point level with the upper end of the overflow pipe 26. Any liquid forced into the reservoir above this level will drain out through the overflow pipe. The crank 71 is then turned to bring the proper tube into registry with the outlet pipe for withdrawing the quantity of liquid desired, and this movement of the crank 71 simultaneously actuates the counting mechanism to add the amount thus drawn out to the previous total. After this quantity of liquid is drawn out, the crank 16 cannot be operated to force more liquid into the reservoir until the crank 71 is returned to its initial or zero position. When the crank 71 is returned to its initial position, the apparatus is in condition for further operation after the manner just described.

While the invention has been described in connection with one of the forms in which it is adapted to be employed, it is to be understood that the invention is not limited to use in connection with the particular apparatus shown and described herewith, but is capable of a variety of applications such as may be included within the scope of the appended claims.

What I claim is,—

1. In a liquid-measuring apparatus, a reservoir, a passage continuously filled with liquid when the apparatus is in operative condition for supplying liquid to said reservoir, an overflow pipe connected with the interior of said reservoir adapted to withdraw liquid therefrom above a fixed and predetermined level, a discharge pipe, and a multiple port valve having tubes of different heights connected with the several ports, and movable to close off communication between said pipe and reservoir or to bring any one of said ports into registry therewith.

2. In a liquid-measuring apparatus, a reservoir, a passage continuously filled with liquid when the apparatus is in operative condition for supplying liquid to said reservor, an overflow pipe in said reservoir adapted to maintain the liquid therein at a fixed and predetermined level, a discharge pipe, a multiple ported valve cooperating with said discharge pipe, and means carried by said valve adapted to permit the withdrawal of fixed and measured quantities of liquid from the reservoir upon registry of said ports with said discharge pipe.

3. In a liquid-measuring apparatus a reservoir, an overflow pipe communicating with said reservoir and adapted to withdraw liquid above a fixed level therein, a discharge pipe, a rotatable multiple ported valve cooperating with said discharge pipe, means connected with the several ports for withdrawing different fixed and predetermined quantities of liquid from said reservoir when said ports are selectively brought into registry with said discharge pipe and a liquid supply-passage for the reservoir independent of said valve and continuously filled with liquid when the apparatus is in operative condition.

4. In a liquid-measuring apparatus, a reservoir, a passage continuously filled with liquid when the apparatus is in operative condition for supplying liquid to said reservoir, an overflow pipe communicating with said reservoir and adapted to return all liquid above a fixed level therein, a discharge pipe, a multiple ported valve cooperating with said discharge pipe, means for selectively bringing any one of the several ports in the said valve into communication with said discharge pipe, and tubes of different lengths carried by said valve and communicating with said ports, whereby different fixed and measured quantities of liquid may be withdrawn from the reservoir upon bringing different ports into communication with said discharge pipe.

5. In a liquid-measuring apparatus, a measuring chamber having a transparent portion, a passage continuously filled with liquid when the apparatus is in operative condition for supplying liquid to said measuring chamber, an overflow pipe communicating with said measuring chamber and adapted to withdraw all liquid above a certain level, a discharge pipe for said measuring chamber, and a multiple ported valve provided with a plurality of tubes of varying lengths, and means for actuating the valve whereby any one of said ports may be brought into communication with said discharge pipe, whereby a fixed and predetermined quantity of liquid may be withdrawn from the measuring chamber.

6. In a liquid-dispensing apparatus, a reservoir, a supply chamber continuously filled with liquid when the apparatus is in operative condition, an outlet pipe communicating with said reservoir, and a plate located substantially between the reservoir and supply chamber and permitting at all times free inter-communication between the same and having a plurality of ports any one of which may be placed in communication with the outlet pipe.

7. In a liquid-dispensing apparatus, a reservoir to which liquid is supplied, a chamber below the base of the reservoir and in constant communication therewith, a plate supported on the base of the reservoir and provided with a plurality of ports each overlying said chamber for communication therewith, and a discharge port formed in an inwardly-projecting part of the wall of said chamber and with which any one of said ports may register.

8. In a liquid dispensing apparatus, a reservoir, a chamber below the reservoir in constant communication therewith, a plate in the reservoir having a plurality of ports, a discharge port provided for the reservoir and normally closed by said plate, means to move the latter to bring any one of the first named ports into registry with the discharge port, and a cumulative register operated by movement of said plate.

9. In a liquid dispensing apparatus, a reservoir, a chamber below the reservoir in constant communication therewith, a plate in the reservoir having a plurality of ports, a discharge port provided for the reservoir and normally closed by said plate, means to move the latter to bring any one of the first named parts into registry with the discharge port, pumping means to supply liquid to said chamber, and means operable by the movement of said plate into any of its discharge positions to lock the pumping means against operation.

10. In a liquid dispensing apparatus, a reservoir, a chamber below the reservoir in constant communication therewith, a plate in the reservoir having a plurality of ports, a discharge port provided for the reservoir and normally closed by said plate, means to move the latter to bring any one of the first named ports into registry with the discharge port, pumping means to supply liquid to said chamber, and means for preventing operation of said plate during the operation of said pumping means.

11. A liquid dispensing apparatus, comprising, a reciprocating piston pump, a reservoir, the base of which is connected to the delivery end of the pump, an overflow pipe in the reservoir to withdraw all liquid therein above predetermined level, a discharge passage for the reservoir, and a valve movable from a position in which said passage is closed to various other positions to permit discharge of various predetermined measured quantities of liquid.

In testimony whereof I have affixed my signature.

JOHN B. DAVIS.